United States Patent
Pan et al.

(10) Patent No.: US 8,840,296 B2
(45) Date of Patent: Sep. 23, 2014

(54) LIGHT GUIDE PLATE WITH LIGHT ENTRANCE STRUCTURE AND MANUFACTURE METHOD FOR MANUFACTURING THE SAME

(75) Inventors: Kun-Chih Pan, Miaoli County (TW); Jen-Shun Lin, Miaoli County (TW); Bai-Chen Chang, Miaoli County (TW)

(73) Assignee: BriView Corporation, Taoyuan (TW)

( * ) Notice: Subject to any disclaimer, the term of this patent is extended or adjusted under 35 U.S.C. 154(b) by 91 days.

(21) Appl. No.: 13/173,860

(22) Filed: Jun. 30, 2011

(65) Prior Publication Data
US 2012/0039079 A1 Feb. 16, 2012

(30) Foreign Application Priority Data
Aug. 16, 2010 (TW) ............................ 99127357 A

(51) Int. Cl.
*F21V 7/05* (2006.01)
*F21V 8/00* (2006.01)
*F21V 7/00* (2006.01)

(52) U.S. Cl.
CPC ............ *G02B 6/0065* (2013.01); *G02B 6/0025* (2013.01); *G02B 6/0016* (2013.01)
USPC ............................ 362/622; 362/608; 362/621

(58) Field of Classification Search
CPC .. G02B 6/0038; G02B 6/0036; G02B 6/0016; G02B 6/003; G02B 6/0023; G02B 6/0025; G02B 6/0013; G02B 6/0015; G02F 1/133615
USPC .................................. 362/326, 244, 600–634
See application file for complete search history.

(56) References Cited

U.S. PATENT DOCUMENTS

| 6,805,468 B2 | 10/2004 | Itoh et al. |
| 7,110,642 B2 | 9/2006 | Maeda et al. |
| 2008/0284945 A1* | 11/2008 | Schultz et al. .................. 349/65 |
| 2010/0085771 A1 | 4/2010 | Lin |

FOREIGN PATENT DOCUMENTS

JP 2006185891 7/2006

(Continued)

OTHER PUBLICATIONS

Vikuiti™ BEF Family Application Guidelines—Instruction Sheet, Jan. 19, 2006.*

(Continued)

*Primary Examiner* — Karabi Guharay
*Assistant Examiner* — Nathaniel Lee
(74) *Attorney, Agent, or Firm* — Muncy, Geissler, Olds & Lowe, P.C.

(57) ABSTRACT

A light guide plate and manufacture methods thereof are provided. The light guide plate includes a plate body, an optical adhesive layer, and a light entrance structure layer. The plate body has a light exit surface and a light entrance surface. The light entrance surface is connected to a side of the light exit surface and intersects the light exit surface with an angle. The optical adhesive layer is attached on the light entrance surface while the light entrance structure layer is attached to the optical adhesive layer. The light entrance structure layer includes a substrate and a light-cured or thermal-cured structure. The light-cured or thermal-cured structure is made of light or thermal curable material and firmly formed on a structured surface of the substrate through a light or thermal curing process.

2 Claims, 8 Drawing Sheets

(56) References Cited

FOREIGN PATENT DOCUMENTS

| | | |
|---|---|---|
| JP | 2007095624 | 4/2007 |
| TW | 580550 | 3/2004 |
| TW | 200643535 | 12/2006 |
| TW | 200720781 | 6/2007 |
| TW | 200848809 A | 12/2008 |
| TW | 200918293 A | 5/2009 |
| TW | 200919025 A | 5/2009 |
| TW | 201015129 A | 4/2010 |

OTHER PUBLICATIONS

Vikuiti™ BEF Family Application Guidelines—Instruction Sheet.*
Hawley's Condensed Chemical Dictionary, 14th edition, 2002, John Wiley & Sons, Inc.*
Official Action issued on Jun. 24, 2013, by the Taiwanese Patent Office in corresponding Taiwanese Patent Application No. 099127357.

* cited by examiner

LIGHT GUIDE PLATE WITH LIGHT ENTRANCE STRUCTURE AND MANUFACTURE METHOD FOR MANUFACTURING THE SAME

BACKGROUND OF THE INVENTION

1. Field of the Invention

The present invention generally relates to a light guide plate and a manufacture method for the same. Particularly, the present invention relates to a light guide plate with light entrance structure and a manufacture method for the light guide plate.

2. Description of the Prior Art

Liquid crystal display (LCD) devices are widely applied to electronic devices such as LCD televisions, computers, mobile phones, and personal digital assistants (PDA). Possessing advantageous properties such as light-weight, thin dimensions, energy-conserving, low radiation emittance, LCD devices have expanded the market scope as their dimensions and the quality of product specifications increase. One of the important components of LCD devices is backlight modules. Due to the fact that the liquid crystal material of LCD devices is not self-luminous, backlight modules are required to assist in providing light for displaying effects. As the application of different sized panels of LCD devices continually increases, the long term prospects of backlight modules are also positive. In particular, as a result of substantial growth in demand for LCD devices in recent years in the marketplace, backlight modules utilized in LCD devices are also increasingly varied in design to comply with the demands for increased capabilities and better aesthetics of the LCD devices.

An important component of side-light type backlight modules is light guide plates, wherein the main function of the light guide plate is to guide the traveling direction of light to achieve the effect of increasing the brightness uniformity of the light. As shown in FIG. 1 of a conventional light guide plate 10, a plurality of microstructures 30 is formed on the light entrance side of the light guide plate 10. The plurality of microstructures 30 is disposed corresponding to the light source within the backlight module. The main functionality of the plurality of microstructures 30 is to change the path of the light that has entered in order to decrease effects of light convergence. In a typical conventional manufacturing method, the microstructures 30 are integrally formed on the light guide plate 30 by injection molding methods. However, as the dimensions of display surfaces increase, the dimensions of backlight modules and light guide plates must also correspondingly increase. Under these circumstances, the microstructures 30 integrally formed by injection molding methods will encounter difficulties in controlling injection pressures or other problems and eventually result in unsatisfactory product quality.

SUMMARY OF THE INVENTION

It is an object of the present invention to provide a light guide plate having manufacturing-friendly microstructures on the light entrance side.

It is another object of the present invention to provide a light guide plate manufacturing method that can easily form microstructures on the light entrance side end of the light guide plate.

The light guide plate of the present invention includes a plate body, an optical adhesive layer, and a light entrance structure layer. The plate body has a light exit surface and a light entrance surface, wherein the light entrance surface is connected to one side of the light exit surface with an angle. Light enters the plate body through the light entrance surface, propagates within the plate body by total internal reflection, and then exits the plate body from the light exit surface. An optical adhesive layer is attached onto the light entrance surface. A light entrance structure layer is attached to one side of the optical adhesive layer opposite to the light entrance surface. The light entrance structure layer includes a substrate and a light-cured or thermal-cured structure. In order to comply with the shape of the light entrance surface of the plate body, the substrate may be formed as a stripe shape having an adhering surface and a structured surface parallel and opposite to each other. The adhering surface adheres to the optical adhesive layer while the structured surface faces away from the optical adhesive layer. The light-cured or thermal-cured structure is formed from light or thermal curable material that is cured by light or heat to form the light-cured or thermal-cured structure on the structured surface of the substrate. Through light or thermal curing processes, the light-cured or thermal-cured structure may be inseparably connected onto the structured surface.

The light guide plate manufacturing method includes the following steps: distributing a light or thermal curable material on a substrate, shaping and curing the light or thermal curable material into a light-cured or thermal-cured structure, disposing an optical adhesive layer on one side of the substrate opposite to the light-cured or thermal-cured structure, cutting the substrate along with the light-cured or thermal-cured structure to form a light entrance structure layer, and attaching the optical adhesive layer to a light entrance surface of a plate body to attach the optical entrance structure layer to the light entrance surface.

DETAILED DESCRIPTION OF THE PREFERRED EMBODIMENT

The present invention provides a light guide plate and a manufacturing method thereof. In a preferred embodiment, the light guide plate is provided for use in backlight modules. Backlight modules are preferably disposed in liquid crystal display devices or in display devices within other electronic devices to provide the backlighting necessary for displaying images. The mentioned electronic device can preferably include handheld electronic devices or electronic home appliances such as flat panel displays, personal computers, laptop computers, mobile phones, and other related electronic devices.

Figure 1:
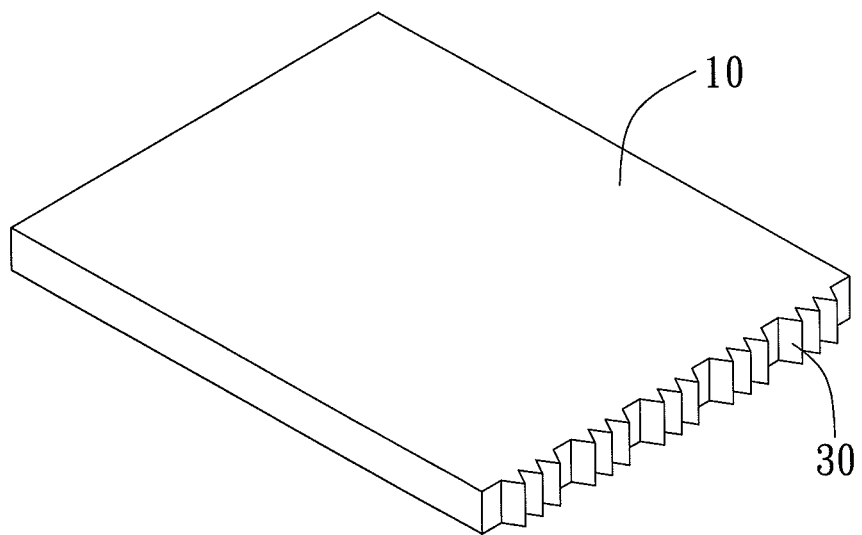
FIG. 1 is a perspective view of the conventional light guide plate.
Figure 2A:
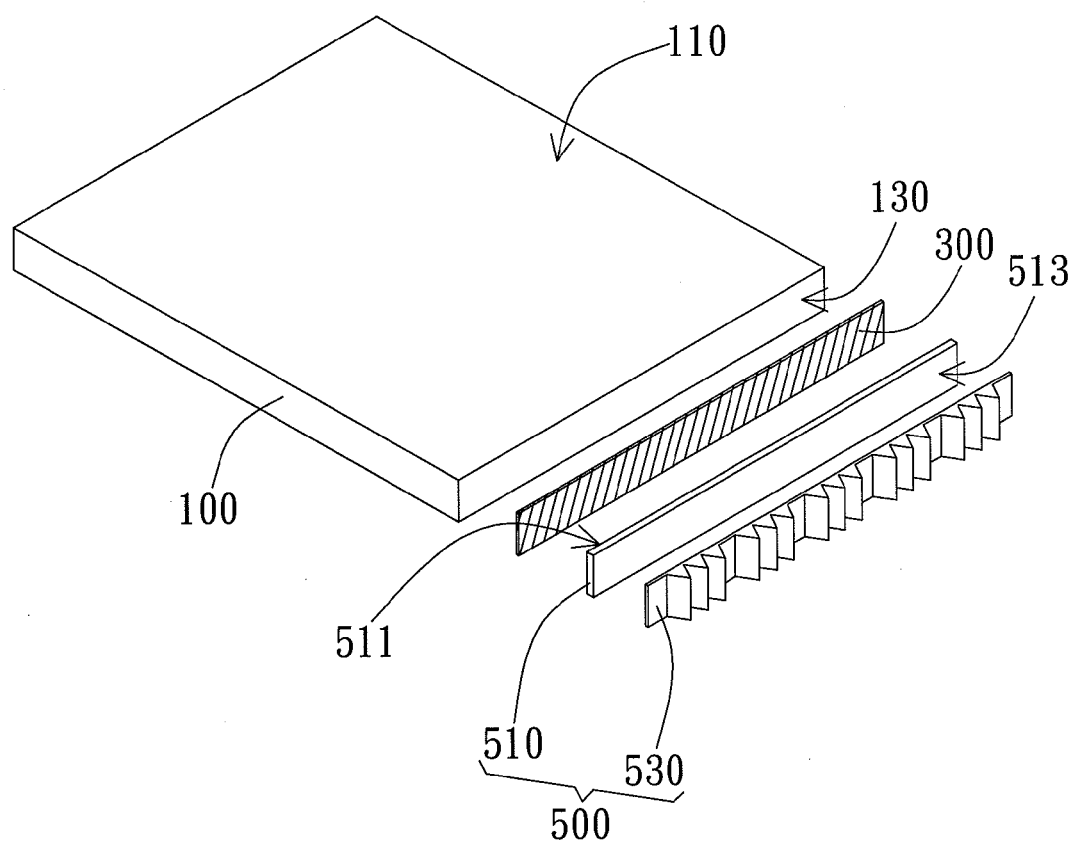
FIG. 2A is an exploded view of an embodiment of the light guide plate of the present invention.
Figure 2B:
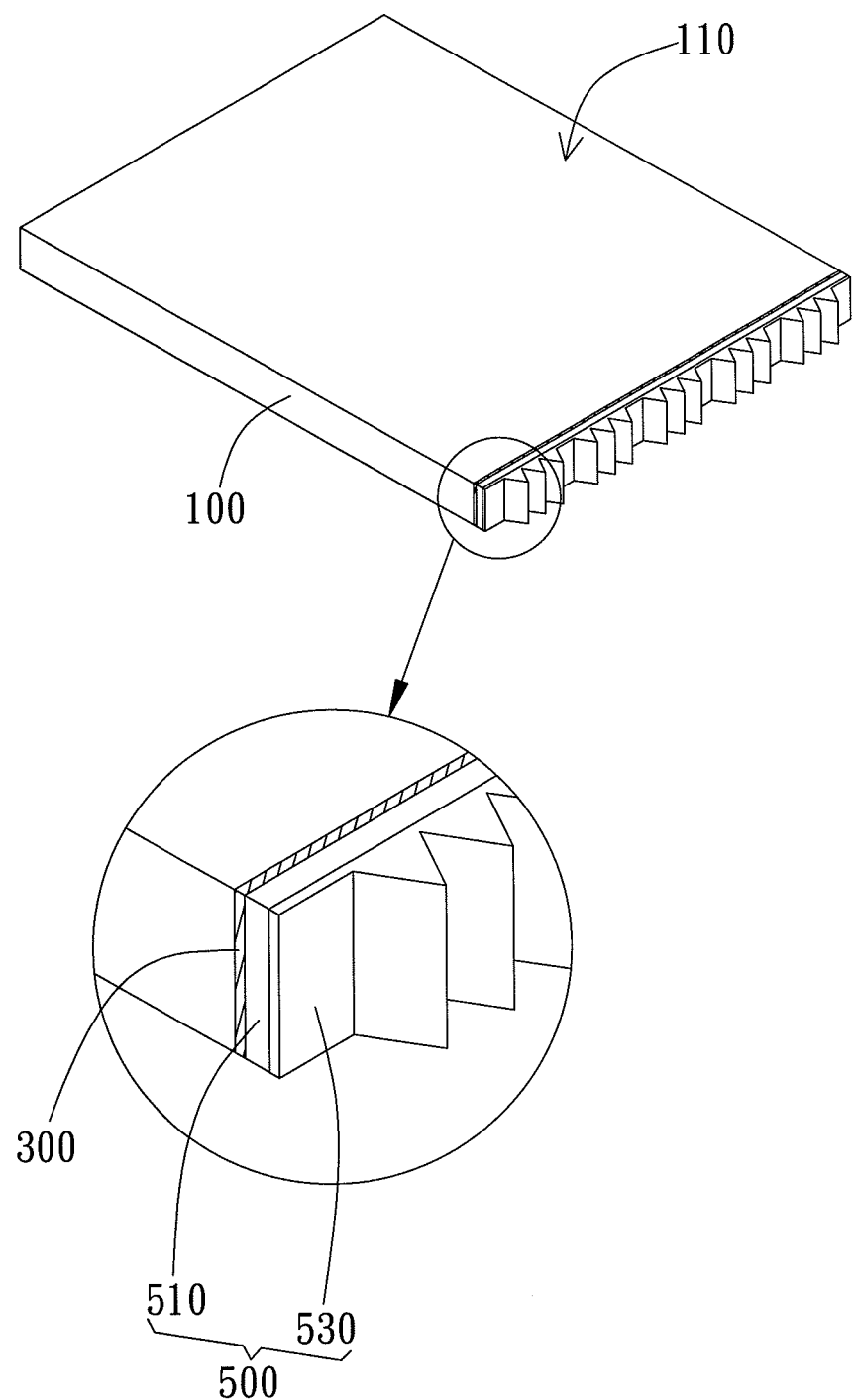
FIG. 2B is a perspective view of the embodiment of the light guide plate.

As shown in the embodiment in FIGS. 2A and 2B, the light guide plate includes a plate body 100, an optical adhesive layer 300, and a light entrance structure layer 500. The plate body 100 is preferably a rectangular flat plate having a light exit surface 110 and a light entrance surface 130. As shown in FIG. 2A, the light exit surface 110 is the top surface of the plate body 100, while the light entrance surface 130 is the side end surface of the plate body 100. The light entrance surface 130 is connected to one side of the light exit surface 110 with an angle. In the preferred embodiment, the angle is 90 degrees such that the light entrance surface 130 is basically perpendicular to the light exit surface 110. Light enters the plate body 100 through the light entrance surface 130 and propagates within the plate body 100 by total internal reflection, whereby the light then exits the plate body 100 from the light exit surface 110. In addition, the plate body 100 preferably is made of polymethylmethacrylate (PMMA), polycarbonate (PC), or polyethylene terephthalate (PET). However, in different embodiments, the plate body 100 may also be made of other plastic materials, optical glass, or any other materials.

Figure 3:
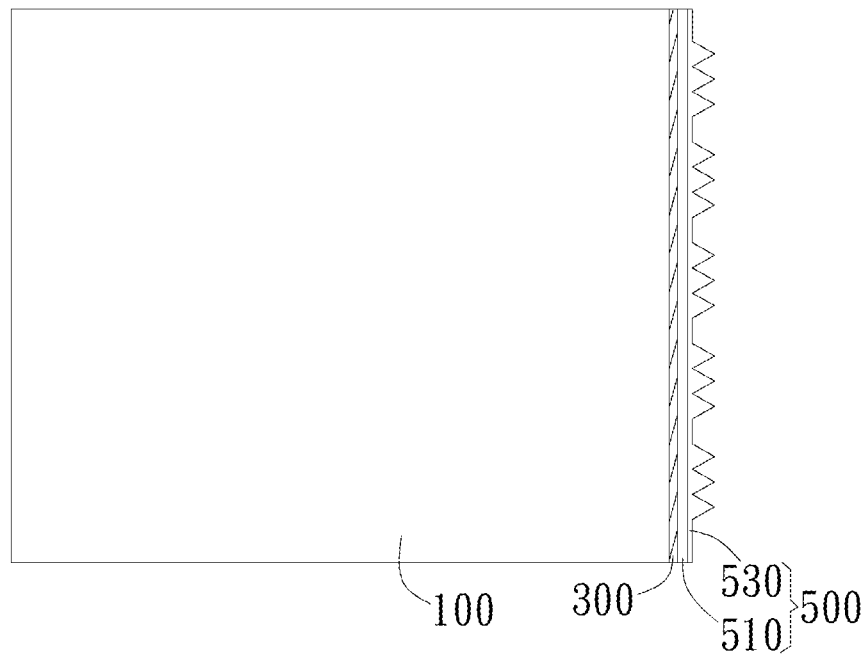
FIG. 3 is a top view of the embodiment of the light guide plate.

As shown in FIGS. 2A, 2B, and 3, the optical adhesive layer 300 is attached onto the light entrance surface 130. In order to comply with the shape of the light entrance surface 130, the optical adhesive layer 300 may be formed as a stripe shape. In a preferred embodiment, the optical adhesive layer 300 and the light entrance surface 130 are inseparably adhered to each other without any gaps. Due to the fact that the light propagating in the plate body 100 is susceptible to influence from the interface between different mediums, by attaching the optical adhesive layer 300 and the light entrance surface 130 together inseparably without any gaps, influences from air gaps may be prevented to ensure lower influences on the light propagation. The optical adhesive layer 300 may be formed by attaching or coating processes (such as liquid optical adhesive) and has a light transmittance preferably greater than 80%. In the preferred embodiment, the light transmittance of the optical adhesive layer 300 is substantially 92%. In addition, the thickness of the optical adhesive layer 300 is preferably between 5 μm and 100 μm in order to control the influences to the path of light and enhance the adhesion stability.

Figure 4:
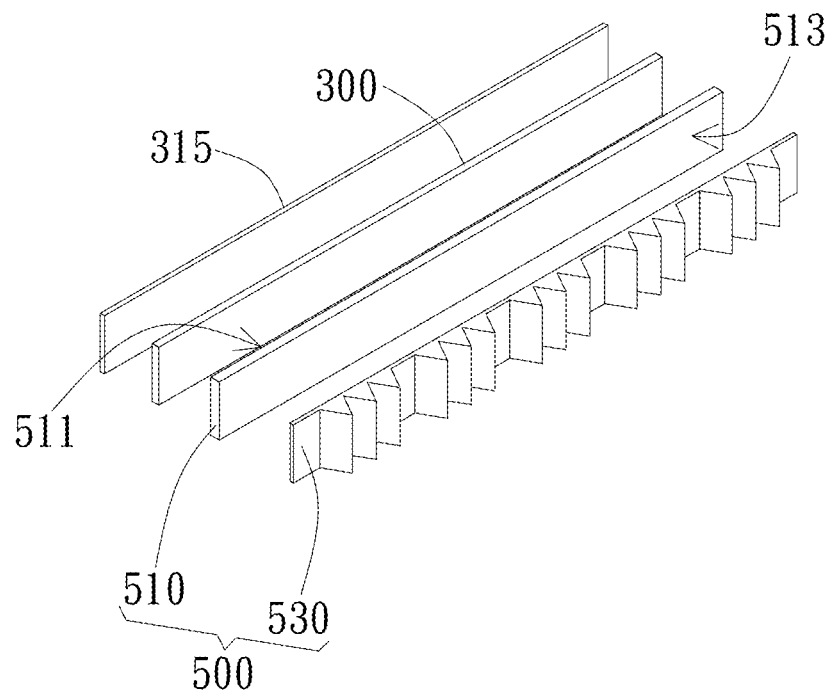
FIG. 4 is a perspective view of the light entrance structure layer.

As shown in FIGS. 2A, 2B, and 3, a light entrance structure layer 500 is attached to one side of the optical adhesive layer 300 opposite to the light entrance surface 130. In the preferred embodiment, the light entrance structure layer 500 and the optical adhesive layer 300 are securely attached to each other such that the probability of air between the light entrance structure layer 500 and the optical adhesive layer 300 can be reduced. As shown in FIG. 4, the light entrance structure layer 500 includes a substrate 510 and a light-cured or thermal-cured structure 530. In order to comply with the shape of the light entrance surface 130 of the plate body 100, the substrate 510 is preferably shaped as a stripe and has an adhering surface 511 and a structured surface 513 parallel and opposite to each other. However, in a different embodiment, the adhering surface 511 and the structured surface 513 may also not be parallel to each other, but rather instead have an angle between them so that the substrate 510 has a wedge-like cross sectional shape. The adhering surface 511 is attached to the optical adhesive layer 300 while the structured surface 513 faces away from the optical adhesive layer 300. The substrate 510 is preferably made of polymethylmethacrylate (PMMA), polycarbonate (PC), or polyethylene terephthalate (PET). However, in different embodiments, the substrate 510 may also be made of other plastic materials, optical glass, or any other materials.

The light-cured or thermal-cured structure 530 is formed from transparent light or thermal curable material that is cured by light or heat so that the light-cured or thermal-cured structure 530 is formed on the structured surface 513 of the substrate 510. By utilizing light curing processes, the light-cured or thermal-cured structure 530 is securely connected onto the structured surface 513. The light-cured or thermal-cured structure 530 can include prism, lens, dot-type diffusion structure, or any other structures capable of redirecting light paths. In the preferred embodiment, the light-cured or thermal-cured structure 530 is a diffusion structure provided for diffusing light coming from the light source so that the phenomenon where light converges on the side of the light exit surface 110 of the plate body 100 may be prevented or reduced. The light or thermal curable material of the light-cured or thermal-cured structure 530 preferably includes polymethylmethacrylate (PMMA), polyurethanes (PU), and liquid silicone glues.

In a preferred embodiment, the refractive index of the plate body 100 is equal to or greater than the optical adhesive layer 300 in order to maintain the light use efficiency. Similarly, the refractive index of the optical adhesive layer 300 is preferably equal to or greater than the refractive index of the substrate 510 of the light entrance structure layer 500. In turn, the refractive index of the substrate 510 is preferably equal to or greater than the refractive index of the light-cured or thermal-cured structure 530. Through this design, problems of inefficient use of light may be reduced.

Figure 5:
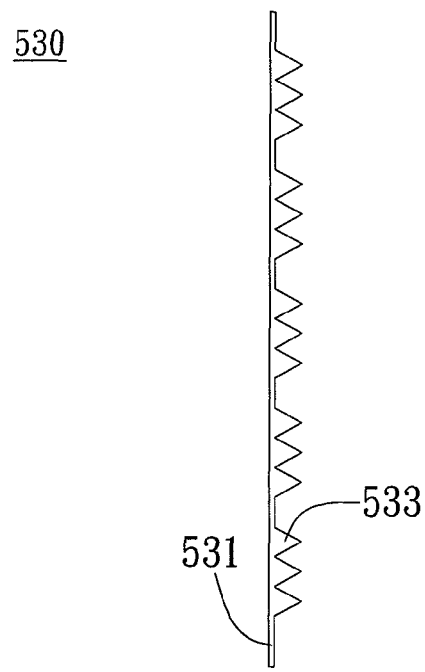
FIG. 5 is a perspective view of an embodiment of the light cured structure.
Figure 6:
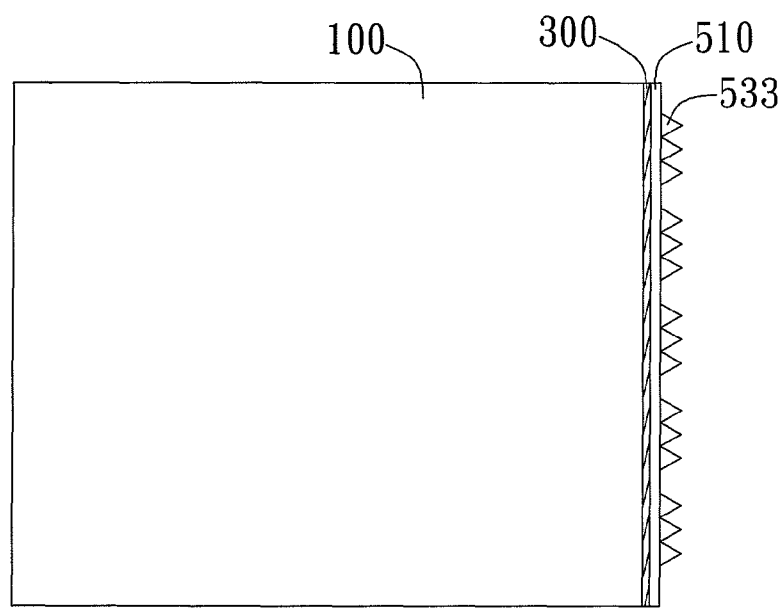
FIG. 6 is a top view of another embodiment of the light guide plate.

As shown in FIG. 5, the light-cured or thermal-cured structure 530 preferably includes a bottom layer 531 and a structure body 533, wherein a plurality of structure bodies 533 is formed on the bottom layer 531. A surface side of the bottom layer 531 is attached onto the structured surface 513 of the substrate 510 while the other surface side has the structure bodies 533 formed thereon. In comparison to independently connecting each individual structure body 533 directly to the structured surface 513 of the substrate 510, since the contact surface area between the bottom layer 531 and the structured surface 513 is relatively larger, a more stable connection can be provided. However, in a different embodiment as shown in FIG. 6, a design without the bottom layer 531 may be adopted, wherein each individual structure body 533 is independently connected directly onto the structured surface 513 of the substrate 510. In addition, in the preferred embodiment, the thickness of the bottom layer 531 is controlled to be smaller than 5 μm.

Figure 7:
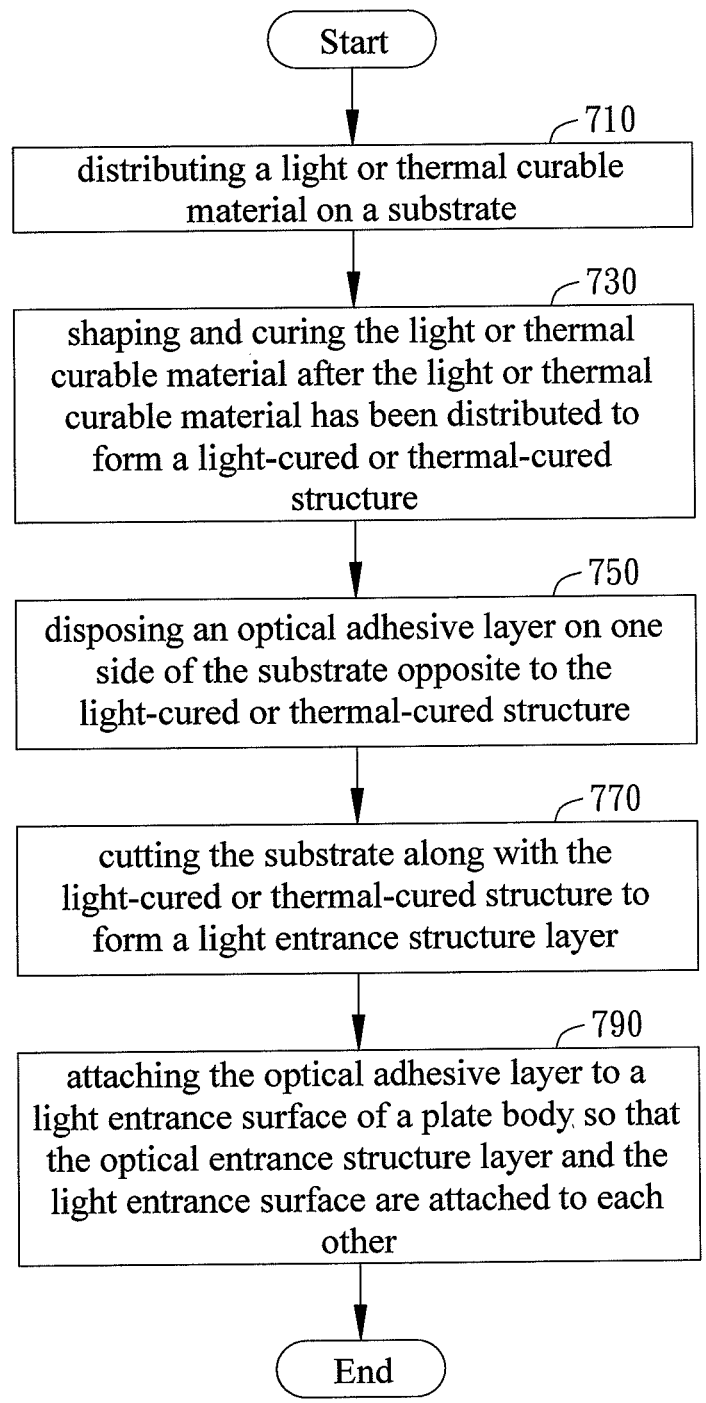
FIG. 7 is a flowchart of an embodiment of the light guide plate manufacturing method.

As shown in FIG. 7, an embodiment of a method of manufacturing a light guide plate includes step 710 of distributing a light or thermal curable material on a substrate 510. The distribution of the light or thermal curable material may be realized through processes such as coating, spraying, adhering, or any other distribution processes. Step 730 includes shaping and curing the light or thermal curable material after the light or thermal curable material has been distributed. The light or thermal curable material may be shaped through die pressing on the light or thermal curable material with a suitable pressure level such that the light or thermal curable material produces a shape within the mold. The light or thermal curable material is then cured and hardened under ultraviolet light (UV light) or any other light such that the light or thermal curable material is hardened into a light-cured or thermal-cured structure 530 connected to the substrate 510.

Step 750 includes disposing an optical adhesive layer 300 on one side of the substrate 510 opposite to the light-cured or thermal-cured structure 530. The optical adhesive layer 300 may be selected from optical adhesive films or liquid optical adhesives. When the optical adhesive film is adopted, the optical adhesive layer 300 is disposed onto the substrate 510 in an adhering manner. When the liquid optical adhesive is utilized, the optical adhesive layer 300 is disposed onto the substrate 510 in a coating manner. In the preferred embodiment, after the optical adhesive layer 300 is disposed, a protective film 315 is attached onto the exposed surface of the optical adhesive layer 300 in order to provide protection for the optical adhesive layer 300.

Figure 8:
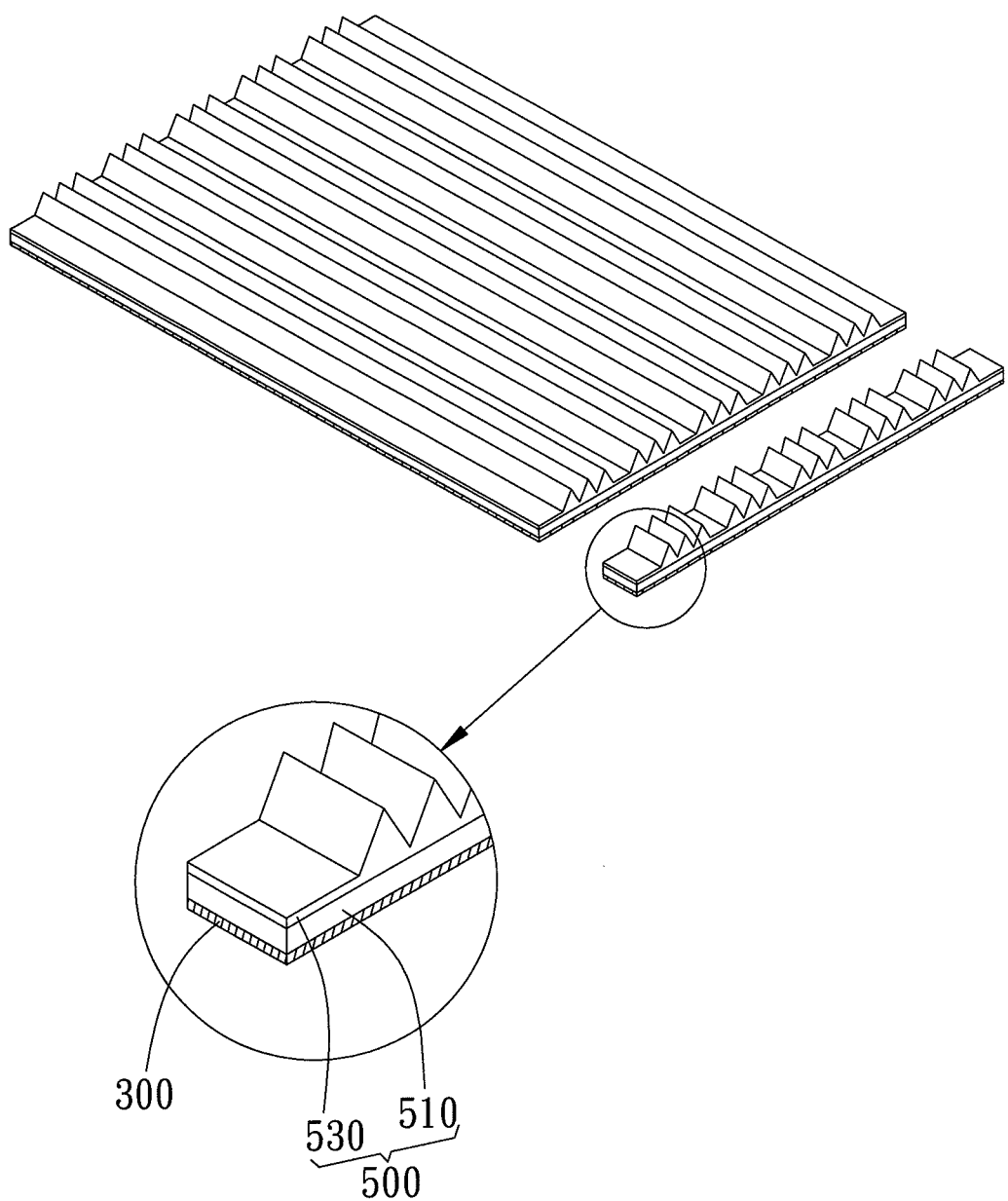
FIG. 8 is a perspective view of an embodiment of the manufacture of light entrance structure layer.

Step 770 includes cutting the substrate 510 along with the light-cured or thermal-cured structure 530 to form a light entrance structure layer 500. In the preferred embodiment, the light entrance structure layer 500 is cut into stripes in order to satisfy the requirements of attaching the light entrance structure layer 500 to an end of the plate body 100 afterwards, as shown in FIG. 8. In addition, in the present embodiment, since the optical adhesive layer 300 is already disposed on the substrate 510, the process of cutting the substrate 510 will also simultaneously cut the optical adhesive layer 300. However, in different embodiments, the substrate 510 and the light-cured or thermal-cured structure 530 may be cut prior to disposing the optical adhesive layer 300 onto the substrate 510.

Step 790 includes attaching the optical adhesive layer 300 to a light entrance surface 130 of a plate body 100 so that the optical entrance structure layer 500 and the light entrance surface 130 are attached to each other. As mentioned above, the light entrance surface 130 is preferably connected to one side of a light exit surface 110 of the plate body 100 with an angle. Prior to attaching the optical adhesive layer 300 to the light entrance surface 130 of the plate body 100, the protective film 315, if any, attached onto the optical adhesive layer 300 is required to be removed or stripped off.

Figure 9:
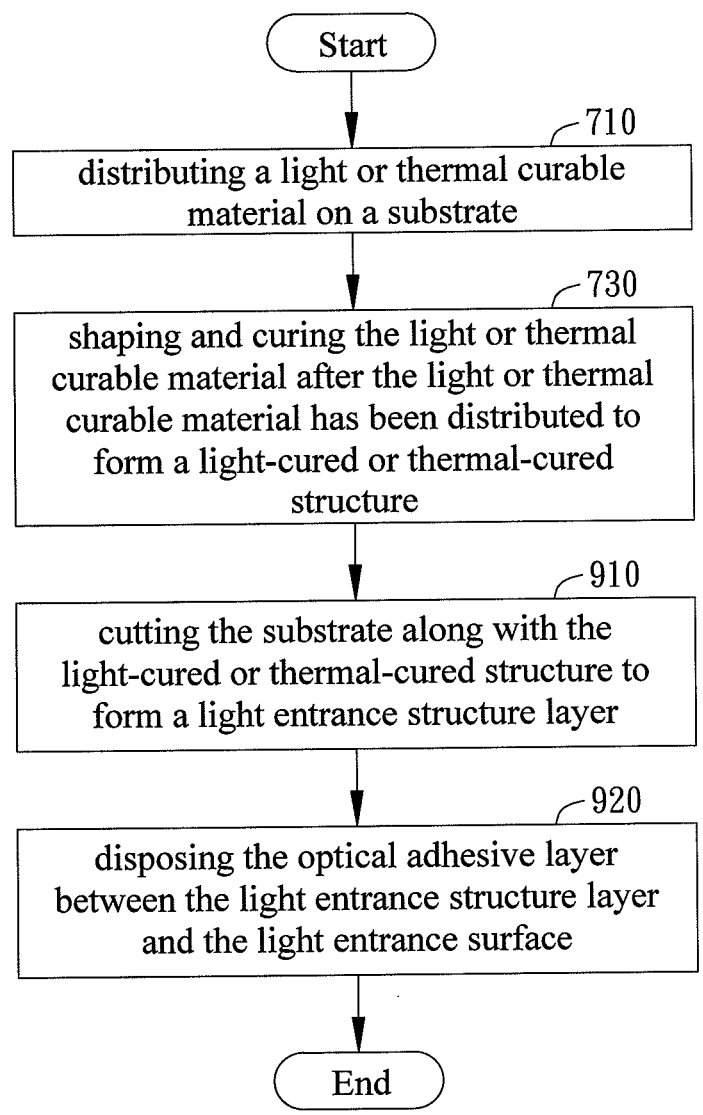
FIG. 9 is a flowchart of another embodiment of the light guide plate manufacturing method.

FIG. 9 illustrates another embodiment of the method of manufacturing of a light guide plate. In the present embodiment, the substrate 510 is cut prior to disposing the optical adhesive layer 300, as shown in step 910. In step 920, the optical adhesive layer 300 is disposed between the light entrance structure layer 500 and the light entrance surface 130 of the plate body 100 such that the light entrance structure layer 500 and the light entrance surface 130 are attached to each other. In accordance with whichever is more convenient during the manufacturing process, the optical adhesive layer 300 may be attached firstly on either the light entrance structure layer 500 or the light entrance surface 130.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A method of manufacturing a light guide plate, comprising:
    distributing a light or thermal curable material on a substrate;
    shaping and curing the light or thermal curable material into a light-cured or thermal-cured structure;
    disposing an optical adhesive layer on one side of the substrate opposite to the light-cured or thermal-cured structure;
    cutting the substrate along with the light-cured or thermal-cured structure to form a light entrance structure layer;
    attaching the optical adhesive layer to a light entrance surface of a plate body to attach the optical entrance structure layer to the light entrance surface, wherein the light entrance surface is connected to one side of a light exit surface of the plate body with an angle,
    the step of disposing the optical adhesive layer further comprises attaching a protective film to a surface of the optical adhesive layer opposite to the substrate, and
    the step of attaching the optical adhesive layer to the plate body further comprises removing the protective film.

2. The method of claim 1, wherein the step of cutting the substrate comprises simultaneously cutting the substrate and the optical adhesive layer.

* * * * *